United States Patent [19]
Geck et al.

[11] 3,775,544
[45] Nov. 27, 1973

[54] APPARATUS FOR MAKING STEEL FROM SCRAP METAL

[75] Inventors: Günter Geck, Duisburg; Hans Jürgen Langhammer, Hagen, both of Germany

[73] Assignee: Klockner-Werke AG, Duisburg, Germany

[22] Filed: Jan. 5, 1972

[21] Appl. No.: 215,552

Related U.S. Application Data

[60] Division of Ser. No. 17,369, March 9, 1970, abandoned, which is a continuation-in-part of Ser. No. 862,762, Oct. 1, 1969, abandoned.

[30] Foreign Application Priority Data
Mar. 10, 1969 Germany.................... P 19 11 994.9

[52] U.S. Cl. ..................................... 13/2, 266/34 L
[51] Int. Cl....................... F27b 14/06, H05b 11/00
[58] Field of Search..................... 13/2, 9; 266/34 L, 266/33 R

[56] References Cited
UNITED STATES PATENTS

| 1,102,382 | 7/1914 | Benjamin............................... 13/2 X |
| 3,197,539 | 7/1965 | Hinds..................................... 13/2 X |
| 3,232,748 | 2/1966 | Rinesch............................... 13/2 UX |

Primary Examiner—Roy N. Envall, Jr.
Attorney—Michael S. Striker

[57] ABSTRACT

A charge of scrap metal is confined in an upright chamber and a flame is directed upwardly from below against the scrap metal until the same melts. Alloying components are admitted to the molten metal and the temperature of the resulting mixture is raised to a predetermined level at which it becomes converted into pourable steel.

9 Claims, 6 Drawing Figures

APPARATUS FOR MAKING STEEL FROM SCRAP METAL

CROSS-REFERENCE TO RELATED APPLICATION

The present application is a division of the copending application Ser. No. 17,369, filed on Mar. 9, 1970, now abandoned, which, in turn, is a continuation in part application of application Ser. No. 862,762, filed Oct. 1, 1969, now abandoned.

BACKGROUND OF THE INVENTION

The present invention relates generally to metal processing, and more particularly to the making of steel. Still more specifically the invention relates to an apparatus for making steel from scrap metal.

In the aforementioned application Ser. No. 862,762 we disclosed a method and apparatus for melting of particulate metal. A column of scrap metal is confined in an upright enclosure and a central flame is directed from below against the column, with the molten metal running off onto the bottom wall of the enclosure. This metal protects the bottom wall against damage from the flame. In one embodiment the molten metal is fed directly to a vessel containing liquid pig iron; combustion of the carbon and the auxiliary elements provides for the movement of the liquid-metal bath which is necessary for steel manufacture, and on the other hand affords the requisite heat equalization.

However, the disclosure according to this co-pending application requires the use of the molten pig iron, and this is not always possible and under certain circumstances not desirable.

SUMMARY OF THE INVENTION

It is, accordingly, an object of the invention to improve upon the apparatus of the aforementioned co-pending application.

More particularly, it is an object of the invention to provide an apparatus for making steel from scrap metal which does not require the use of molten pig iron.

In pursuance of these objects, and of others which will become apparent hereafter, feature of the invention resides in the novel apparatus in which, briefly stated, a charge of scrap metal is confined in an upright chamber having a bottom wall. Against this charge there is directed a splayed flame in direction upwardly from the bottom wall, so that the metal melts and flows onto the bottom wall. The molten metal is collected and alloying components are admitted into it. The temperature of the mixture is then raised to a predetermined level at which it becomes converted into pourable steel.

The alloying components may be admitted into whatever vessel in which the molten metal is collected, but before the metal enters into the vessel.

Heating may be carried out in various ways. One possibility is electro-arc heating, and another is inductive heating. Such inductive heating may be carried out in the collecting vessel itself, or while the molten metal leaves the enclosed space in which it is melted. In the interest of rapid and continuous operation it is desirable —if the melt is heated inductively in a collecting vessel— to utilize at least two vessels in the first one of which the heating of a quantity of collected melt takes place while at the same time melt contained in a second collecting vessel —which was filled previously — is refined and emptied whereupon the second vessel is substituted for the first vessel and the first vessel is subjected to refining.

If heating is carried out by the electro-arc method an electrode device is mounted at a predetermined station for vertical or near-vertical displacement. The collecting vessel is moved to the station and below the device, and thereupon the device is lowered into the vessel through an upper opening of the same. The device may comprise one or several electrodes.

If heating is carried out inductively, the collecting vessel may be provided with an induction coil which may, but need not be embedded in the heat-resistant lining of the vessel. It is also possible, however, to provide an outflow conduit which connects the enclosed space —in which the scrap metal charge is melted— with the collecting vessel, and to provide the induction coil in or on this conduit.

The melt obtained in accordance with the disclosure of the aforementioned copending application, substantially reaches liquidus temperature. The reason is that the scrap metal becomes liquid upon reaching liquidus temperature and flows off and out of the enclosed space without absorbing additional significant quantities of heat. In other words: with reference to the liquidus temperature the melt is only slightly hotter and has reached over 90 percent of the approximately 1,620° C temperature of flowable steel.

On the other hand, liquidus temperature is not sufficient to compensate for temperature losses which occur during filling and to provide the heat necessary to raise the temperature of the coal and calcium, and which is required for the endothermic solution and coal reactions. For this reason the additional heat necessary for the casting process is supplied to the melt, in a separate step and subsequent to admission of the alloying components, resulting in dissolution of these components. The addition of the latter is necessary, inter alia, because the oxidizing conversion process causes the original carbon content of the scrap metal and such other oxidizable components as Mn, Si, Cr and the like, to be partially burned off. The alloying components necessary for the heating and refining process, as well as calcium, may be admitted prior to filling of the vessel with the melt.

The dimensioning of the electrical layout of the apparatus, used for heating the fluid starting metal, depends on the melting velocity, with which the scrap is melted in the flame-heated counterflow method, and the time during which the collecting vessel will be filled. Normally the heating period will last half of the time provided for the filling period, resulting in no bottle-neck. The maximum of the heating time with electrical energy for collecting vessels between 70 and 100 tons will last one hour.

The quantity of the presupposed alloying elements in the collecting vessel depends on the oxydation conditions during the melting time and the specification of the analysis for the aimed steel-quality. The melting loss of the alloying elements is determined by the last process-part and is identical with the loss of the common methods for making electric-furnace steel. While this is valid only for the metallic alloying elements, the melting loss of carbon and by this the addition of solid carbon compounds into the collecting vessel depends on the more or less adjustable oxidizing melting conditions. Depending on the quantity of resulting ferric oxides while this, it is necessary to presuppose equivalent quantities of carbon, for instance in case of a relation of 2.5 Nm³ oxygen to one kg oil in the melting apparatus nearly 50 kg carbon for 1,000 kg fluid steel, if a steel with nearly 0.2 percent carbon shall be made.

A special advantage of the apparatus of this invention is to make steel without needing pig iron. That is very important because it is independent of a blast furnace and the steel can be made where scrap obtains. Furthermore, it is not necessary to invest much capital in the making of steel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
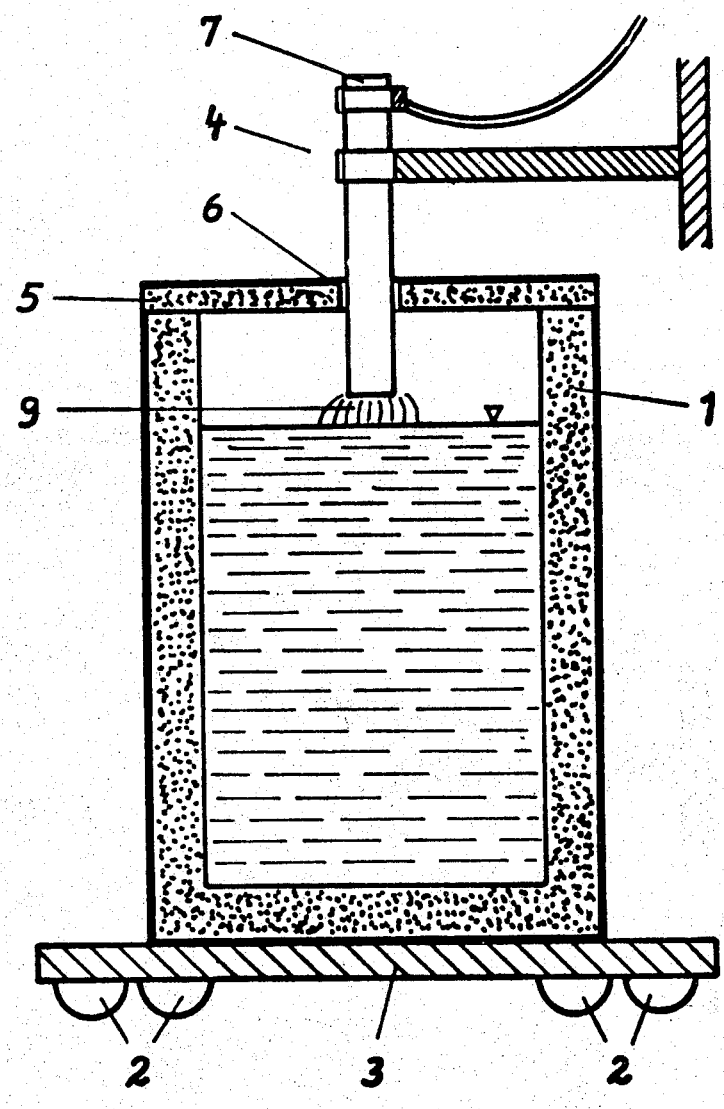
FIG. 1 is a diagrammatic vertical section illustrating one embodiment of the invention.
Figure 5:
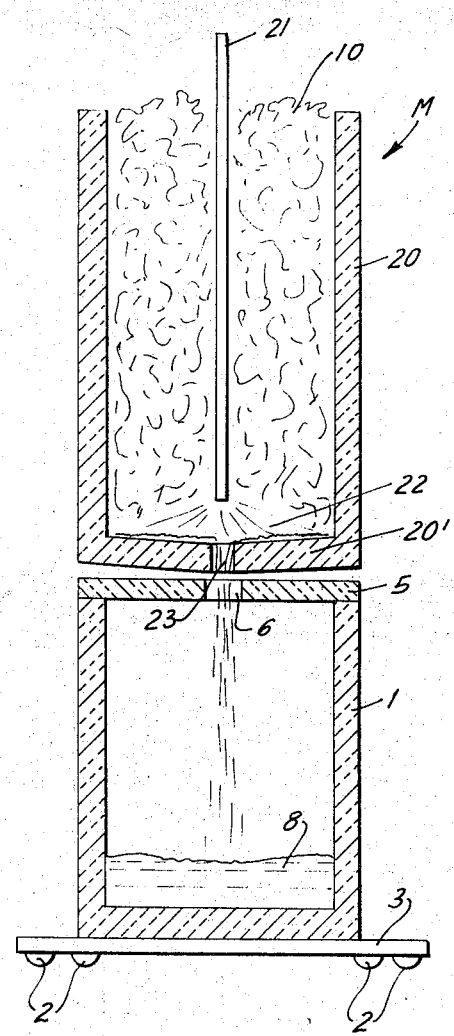
FIG. 5 is a diagrammatic vertical section illustrating a melting vessel above the collecting vessel shown in FIG. 1.

Discussing firstly FIGS. 1 and 5, reference numeral 1 will be seen to identify a collecting vessel for melt produced in accordance with the disclosure of the copending application. The apparatus M for producing this melt is schematically illustrated in FIG. 5, and it may comprise, as shown in this Figure, an upright melting chamber 20 having an upper open end for admitting a charge of scrap metal 10 into the melting chamber, and a bottom wall 20' formed with an outlet opening 23. The apparatus further comprises an upright centrally arranged lance 21 having a lower end upwardly spaced a small distance from the bottom wall 20' through which a mixture of fuel and oxygen is fed into the melting chamber 20 so that a splayed, plate-shaped flame 22 will form adjacent the bottom wall 20' in contact with the lower end of the charge to melt the latter while the hot combustion gases will pass upwardly through the scrap metal 10 constituting the charge to preheat the latter. The molten metal will flow out from the melting chamber 20 through the outlet opening 23 at the bottom wall and pass through the inlet opening 6 on the cover 5 of a vessel 1 located beneath the melting apparatus.

The melt 8 is collected in vessel 1 which is supported on a carriage 3 having wheels or casters 2 to facilitate rapid transportation of the vessel 1 from beneath of the melting apparatus M to the electrode device 4 where the temperature of the melt —which corresponds to liquidus temperature— is increased to approximately 1,620° C. The vessel 1 has the conventional heat resistant lining and is provided with a cover 5 in which an opening 6 is formed through which melt is admitted into vessel 1. When the latter is in the position illustrated in FIG. 1, the vertically displaceable electrode device 4 is lowered until its arc electrode 7 centers the vessel 1 through the opening 6. Energization of electrode 7 produces between the same and the melt 8 an electric arc 9 which increases the temperature of the melt to the desired level. The principle of operation and the construction of the electrode device 4 are of course so well known that they need not be discussed.

Figure 6:
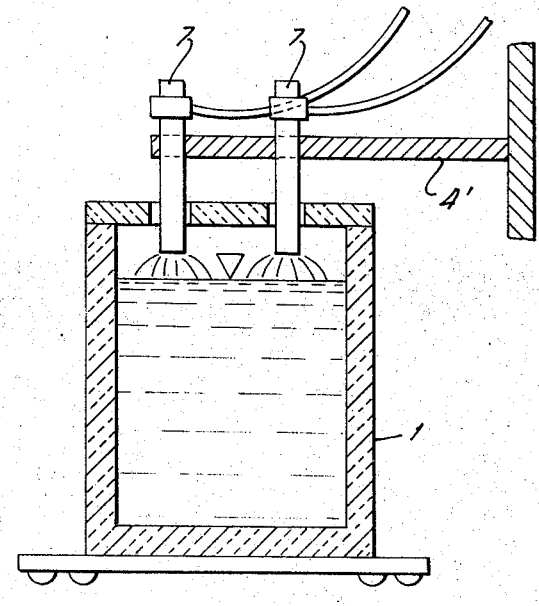
FIG. 6 is a diagrammatic vertical cross section illustrating a modification of the embodiment shown in FIG. 1.

FIG. 6 schematically illustrates a modification of the electrode device 4 shown in FIG. 1, in which the electrode device 4' comprises two electrodes 7 which extend parallel and spaced from each other through appropriate openings in the cover of the vessel 1.

Figure 2:
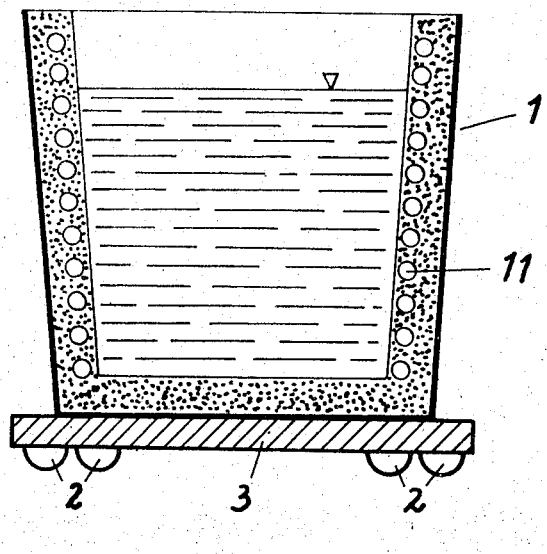
FIG. 2 is a view similar to FIG. 1, but showing a further embodiment of the invention.

The temperature of the melt may also be raised to the desired level by using inductive heating in place of the arc heating. This is shown in FIG. 2 where like reference numerals identify the same elements as in FIG. 1. Here, however, the vessel 1 is provided with an inductive-heating coil 11 whose windings may —but need not— be embedded in the heat-resistant lining of the vessel 1. Again, the construction and principle of operation of an inductive-heating coil are well known and require no description.

Figure 3:
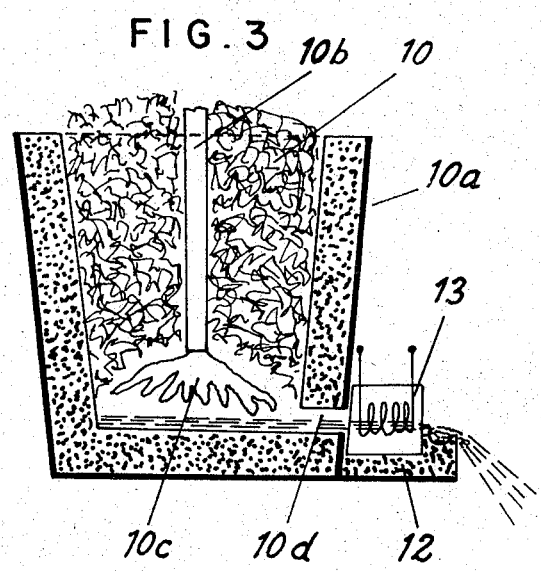
FIG. 3 is a view similar to FIG. 2, but illustrative of yet an additional embodiment.

The embodiment of FIG. 3 also utilizes inductive heating. Here, however, the vessel in which the charge of scrap metal 10 is melted, is shown and identified with reference numeral 10a. A lance 10b extends from above through the charge 10 and combustible fluids issuing from the lower end of the lance 10b support a flame 10c which melts the lower end of the charge 10, so that molten steel flows onto the bottom wall of vessel 10a. An outlet opening 10d is provided through which the molten metal or melt 8 flows off into a conduit 12 which communicates with a non-illustrated collecting vessel.

According to the invention the conduit 12 —which may be closed or else open as illustrated, and which may be of desired cross-section —is provided with one or more induction-heating coils 13 which are positioned as illustrated. Of course, the coils 13 may also be embedded in the walls of conduit 12.

Figure 4:
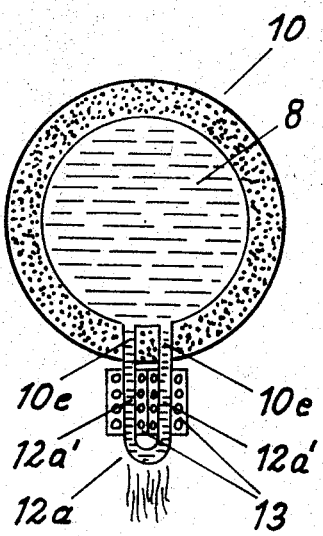
FIG. 4 is a horizontal cross-section showing still another embodiment.

FIG. 4 finally, shows a horizontal section through an arrangement generally similar to that of FIG. 3, looking downwardly from a horizontal section line passing through the outlet 10d. However, in FIG. 4 the vessel 10a is provided with two outlets 10e and the conduit 12a is a double conduit having two channels 12a' each of which has associated therewith one or more of the induction-heating coils 13.

The invention has the advantage that subsequent to the already highly economical melting process —according to the copending application— the melt can be economically converted into castable or flowable steel because the novel invention can be utilized rapidly and with little economic investments.

The invention can be carried out independently of any steel works, because liquid pig iron is not required and only metal scrap is needed. The excess of coal and the reducing effect of the electro-arc heating —if used— reduces the iron content of the slag to a significant extent, whereby the total losses are reduced to the losses of normal electro furnace processes. Electric heating by the arc method is particularly advantageous for heating, alloying and reacting because of the high energy utilization, and because the slag is subjected to greater heat energy and thus becomes metallurgically fully effective.

In the flow-through heating arrangements of FIGS. 3 and 4 the heating effect is obtained in accordance with the transformer principle and heating takes place inductively within a wide range, i.e., not only in the conduit itself but in part already in the melting vessel.

Time availability for heating and refining, as well as adjustment of the respective analysis, exists adequately while the next succeeding change of melt is introduced into its collecting vessel. Furthermore, the melting speed in the melting arrangement —disclosed in detail in the copending application— is readily adjustable without any difficulties and up to the maximum heat availability by adjustment of the burner.

It will be understood that each of the elements described above, or two or more together, may also find a useful application in other types of constructions differing from the types described above.

While the invention has been illustrated and described as embodied in an apparatus for making steel from scrap metal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended

1. An apparatus for making steel from metal scrap comprising an upright melting chamber having a bottom wall; admitting means at the top of said upright melting chamber for admitting a charge of scrap metal into said chamber; first heating means for directing a splayed plate-shaped flame in the region of said bottom wall against said charge so that the metal melts and flows onto said bottom wall while the combustion gases pass upwardly through the scrap metal to preheat the latter; a collecting vessel for collecting the molten metal exteriorly of said chamber; and second heating means for raising the temperature of the collected molten metal to a predetermined level requisite for converting it into pourable steel.

2. An apparatus as defined in claim 10, said collecting vessel having an upper opening; and wherein said second heating means comprises an arc-electrode unit movable from above into and out of said upper opening of said vessel.

3. An apparatus as defined in claim 2, said unit being mounted at a predetermined location; and said vessel being transportable from said chamber to said unit.

4. An apparatus as defined in claim 3, said unit comprising at least one arc electrode.

5. An apparatus as defined in claim 3, said unit comprising a plurality of arc electrodes.

6. An apparatus as defined in claim 10, said collecting vessel having an upright wall; and wherein said second heating means comprises induction heating means for heating said upright wall and thereby said molten metal in said vessel.

7. An apparatus as defined in claim 6, said induction heating means being an induction coil.

8. An apparatus as defined in claim 7, said vessel having a heat-resistant lining, and wherein the winding of said coil is embedded in said lining.

9. An apparatus as defined in claim 1, said vessel being an outflow conduit for said molten metal; and wherein said second heating means is induction heating means associated with said conduit for heating the same and thereby said molten metal therein.

* * * * *